Figure 1:
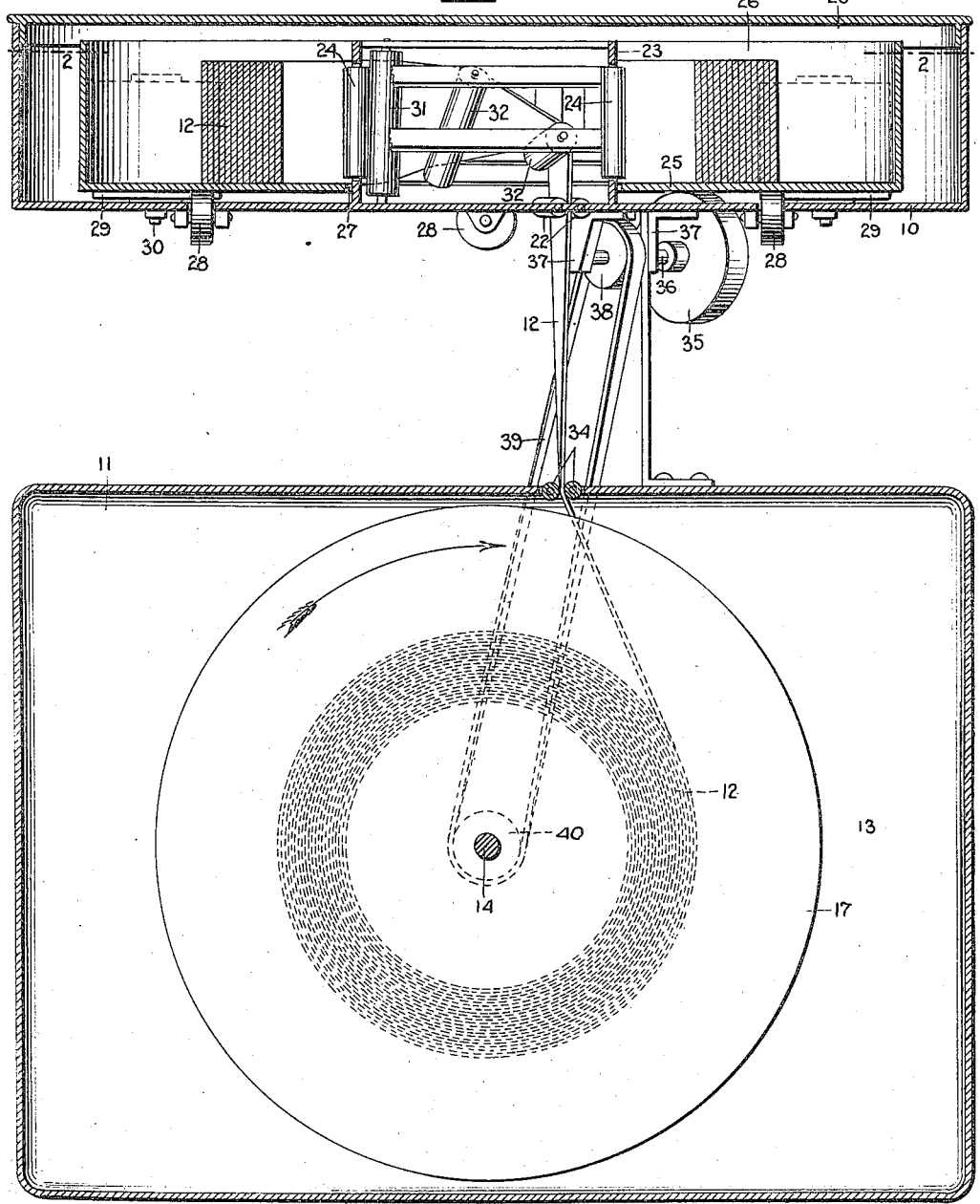

W. P. McNEEL.
PICTURE FILM APPARATUS.
APPLICATION FILED FEB. 25, 1915.

1,186,924.

Patented June 13, 1916.
3 SHEETS—SHEET 2.

WITNESSES:
H. J. Walker
Geo. L. Beeler

INVENTOR
William P. Mc Neel
BY
ATTORNEY

W. P. McNEEL.
PICTURE FILM APPARATUS.
APPLICATION FILED FEB. 25, 1915.
1,186,924.
Patented June 13, 1916.
3 SHEETS—SHEET 3.
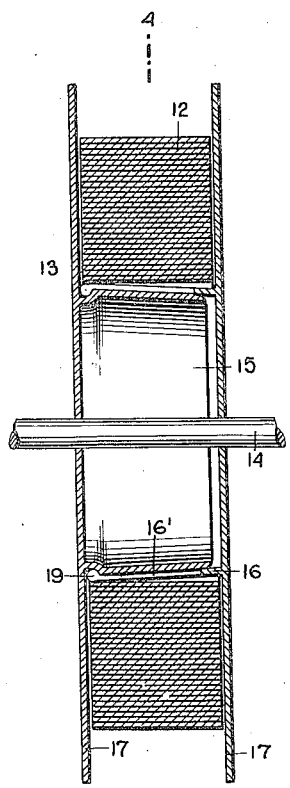
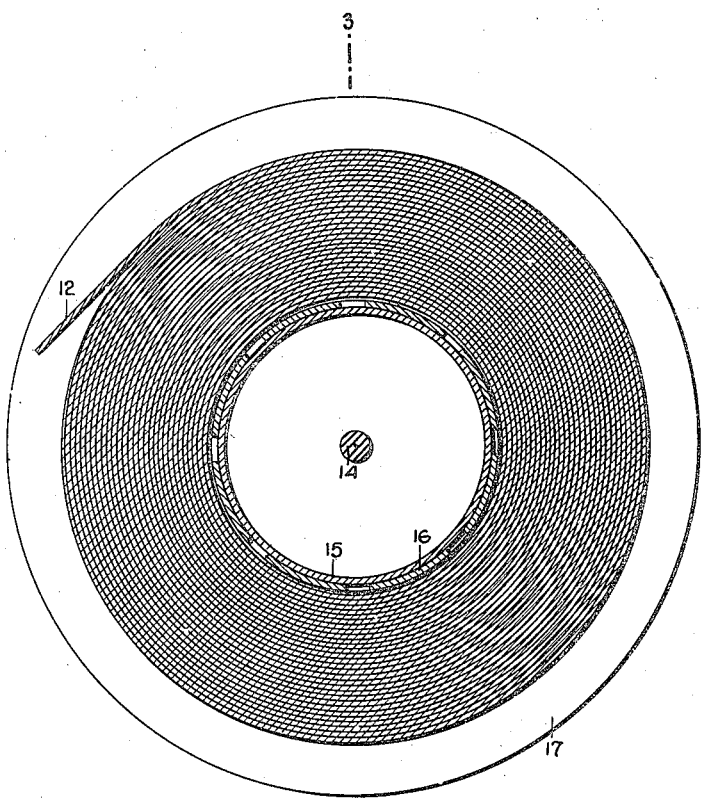
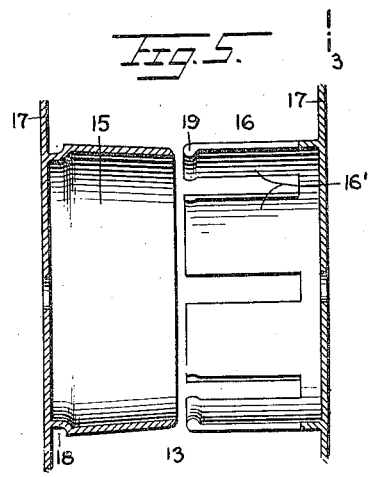
WITNESSES:
H. J. Walker
Geo. L. Beeler
INVENTOR
William P. McNeel
BY Munn Co
ATTORNEY

UNITED STATES PATENT OFFICE.

WILLIAM PINKNEY McNEEL, OF SAN ANTONIO, TEXAS.

PICTURE-FILM APPARATUS.

1,186,924.  Specification of Letters Patent.  Patented June 13, 1916.

Application filed February 25, 1915. Serial No. 10,503.

*To all whom it may concern:*

Be it known that I, WILLIAM PINKNEY McNEEL, a citizen of the United States, and a resident of San Antonio, in the county of Bexar and State of Texas, have invented a new and Improved Picture-Film Apparatus, of which the following is a full, clear, and exact description.

This invention relates to moving picture machinery and has particular reference to means for manipulating the films of such machines.

Among the objects of the invention is to provide improved facilities whereby the rewinding of a film preliminary to a successive display or projection thereof will be avoided.

Another object of the invention is to provide a means for relieving the film from strain or damage incident to the unwinding thereof from a spool or reel during the display operation of the machine.

A further object of the invention is to provide an improved form of reel upon which the film is wound during the act of projection of the picture, said reel comprising separable parts enabling the roll of film to be removed therefrom; to be stored away, or re-used as occasion may require, the same reel being adapted then to be used for receiving another film.

The foregoing and other objects of the invention will hereinafter be more fully described and claimed and illustrated in the drawings forming a part of this specification in which like characters of reference indicate corresponding parts in all the views, and in which—

Figure 2:
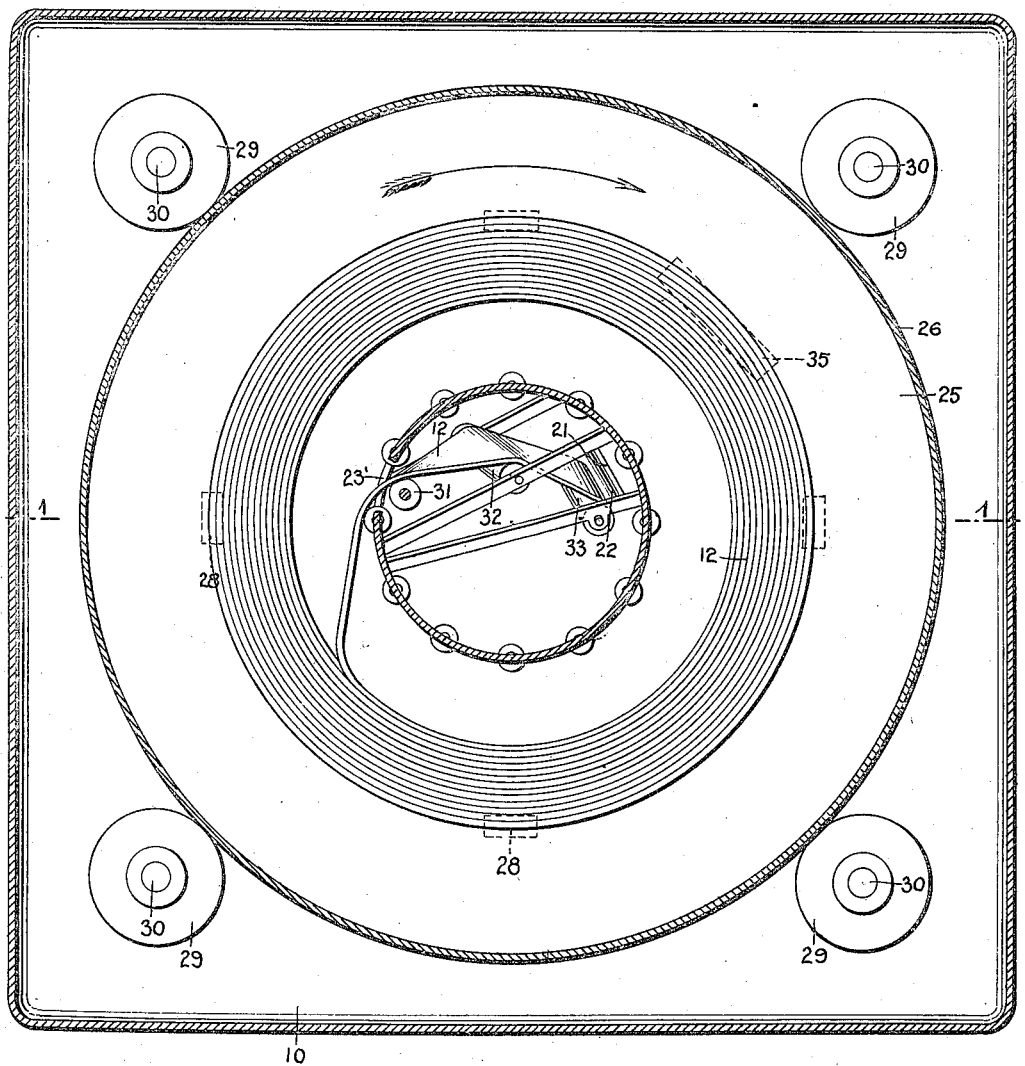

Figure 1 is a vertical sectional view of a preferred embodiment of my improved mechanism substantially on the line 1—1 of Fig. 2; Fig. 2 is a horizontal section on the line 2—2 of Fig. 1; Fig. 3 is a vertical sectional view of a reel with a film wound thereon, the view being in section on the line 3—3 of Fig. 4; Fig. 4 is a vertical transverse section of the same on the line 4—4 of Fig. 3; and Fig. 5 is a view corresponding to Fig. 3 with respect to the reel but with the parts separated.

The several parts of this mechanism may be made of any suitable materials, and the relative sizes and proportions, as well as the general design of the mechanism, may be varied to a considerable extent without departing from the spirit of the invention hereinafter more fully described and specifically claimed.

Referring more particularly to the drawings, I show at 10 and 11 what may be termed upper and lower magazines. These magazines are preferably made of sheet metal or other fireproof material and may be arranged as closely together as will permit of the operation of a moving picture machine between them, the film 12 being adapted to be drawn downwardly from the bottom of the magazine 10 and into the upper portion of the lower magazine; otherwise the film is always protected from fire, dust or other dangerous influences.

Within the lower magazine 11 is mounted a receiving reel 13 of a form preferably as shown in Figs. 3 to 5, the same being mounted upon a shaft 14 driven by any suitable means (not shown) for the purpose of taking up the film 12 upon the hub or spool portion of the reel at the required peripheral speed. The reel herein shown comprises two hub parts 15 and 16 and each hub part is provided with a disk-like side flange 17. The hub member 15 tapers slightly laterally from its flange 17, but at the larger end of the same and directly adjacent the flange it is provided with a circular groove 18. The other hub member 16 comprises a circular series of flexible fingers 16' having on their free ends inwardly projecting beads 19 adapted to snap into the groove 18 when the two hub members are forced one into the other. The coöperation between the fingers of one part and the tapered or conical part of the companion hub serves to hold the two main parts of the reel together for receiving the film 12 thereon in direct contact with the outer surfaces of the fingers 16'. While the film is being wound upon the reel, said fingers are held spread outwardly slightly, and hence when the parts of the reel are separated, said fingers assume their normal position shown in Fig. 5, permitting the roll of film to be slipped freely therefrom and handled as a self-contained roll independently of a special holder therefor.

In the ordinary practice of moving picture machinery, a film, after being wound into a roll or upon a reel, must first be rewound in order to change the ends before it can be run again. I am aware that numerous devices have been proposed having in view the withdrawal of the film from the interior of the roll or reel into or upon which the film is wound, but from my experience with machinery of this character, I am convinced that all of these devices are either unnecessarily complicated or else subject the film to various and serious damaging influences due either to exposure or to unnecessary strains set up upon the film while being drawn from the delivering mechanism.

I overcome the many objections heretofore noted in the known devices by the provision of the special form of upper or delivering magazine 10. The magazine 10 is in the nature of a comparatively shallow horizontal pan having a lid or cover 20 which may be easily removed therefrom for providing access to the interior of the magazine. The bottom of the magazine is provided with a slot or opening 21 on opposite sides of which are journaled anti-friction rollers 22. Surrounding the slot and the center of the bottom of the magazine is arranged a vertically projecting stationary cylindrical collar 23 in the walls of which are journaled a plurality of anti-friction rollers 24, an opening 23' being provided in the collar at one side adjacent at least one of said anti-friction rollers 24.

The outside effective diameter of the collar 23 and its rollers 24 is substantially the same as that of the hub 16 of the reel when in assembled position; hence the roll of film, after removal from the reel, may readily be slipped downwardly around the collar and its rollers where it may rest freely upon the upper surface of what I term a film plate 25 preferably of flat disk-like form and provided with an upstanding peripheral flange 26. Said film plate has a central hole 27 through which the collar 23 projects but out of contact therewith. The plate 25 is supported for anti-friction rotation around the central collar 23 by means of anti-friction rollers 28 and 29 mounted upon the magazine 10. The rollers 28 are mounted upon horizontal axes and project upwardly through the bottom of the magazine and support the weight of the film plate and film thereon. The other rollers 29 are journaled upon vertical pivots 30 within the magazine and prevent lateral displacement of the film plate and any contact between it and the stationary part of the device. It will be seen, therefore, that the film plate and roll of film supported thereon may rotate with practically no friction or resistance around the collar 23.

Within the collar 23 are arranged any suitable number of direction-changing, anti-friction guide rollers 31, 32 and 33. The roller 31 is located just within the opening 23' of the collar and the inner end of the film is threaded through said opening and over the roller 31 and thence over the rollers 32 and 33, to the slot 21 through which it passes between the rollers 22, and thence, after passing in front of the projecting machine (not shown), it is guided between a pair of rollers 34 at the top of the lower magazine 11, whence it is wound upon the reel in the lower magazine as already explained. Since the film is wound upon the reel coil upon coil with a constantly increasing diameter, and the film is withdrawn from the delivering mechanism within the magazine 10 from the inside of the film roll, the peripheral speeds of the film where it is being wound upon the reel and paid out from the delivering roll will always be substantially the same.

The weight of the film roll is borne directly upon the film plate 25 and thereby the film roll is held in substantially fixed position upon the plate while the inner end of the film is being withdrawn therefrom. The draft upon the film exerted by the reel 13 may in some cases be sufficient to cause the rotation of the roll resting upon the rotary film plate, but I prefer to drive the film plate by suitable means so as to relieve the strain upon the film which would otherwise be necessary to cause such rotation of the film and film plate. As a suitable means for this purpose I provide a friction wheel 35 extending upwardly through the bottom of the magazine 10 and having driving contact with the bottom surface of the plate 25. The wheel 35 is secured to a shaft 36 journaled in bearings 37 at the bottom of the magazine and to the same shaft is secured a pulley 38 driven from the shaft 14 through a belt 39 and pulley 40. These several pulleys or wheels may be variously designed as to diameter so as to provide the proper ratio of speed between the reel and the film plate for the purpose above set forth, but as shown herein, the pulleys 38 and 40 are of substantially the same diameter and the ratio of the radius of the pulley 38 to that of the wheel 35 is substantially equal to the relative radial distances of the pulley 38 and wheel 35 from the center or axis of the film plate; hence a single rotation of the reel will be accompanied with a similar rotation of the film plate. The only strain, therefore, to which the film is subjected is that incident to drawing the same through or over the guide rollers, the film plate and remaining bulk of the film being moved through the separate driving mechanism acting around the collar or fixed pedestal 23.

From the foregoing it will be appreciated that I provide an apparatus for manipulating a picture film that is designed to thoroughly protect the film, not only from dust, grit or unnecessary exposure to fire, but which will relieve the film from practically all of damaging tension and surface abrasion incident to the movement of the film from one reel to another.

I claim:—

1. In a picture film apparatus, a magazine comprising a stationary bottom and cylindrical side walls rigidly secured thereto, a vertically extending cylindrical collar centrally disposed within said magazine, a plurality of rollers journaled on vertical axes in the walls of said collar, a film supporting plate arranged to revolve about said collar, said film supporting plate having an upwardly extending peripheral flange, a removable cover arranged to rest on the side walls of the magazine, said cover being spaced from the upper edge of said peripheral flange, means for supporting said film supporting plate, means for rotating the film supporting plate, said collar being provided with a vertically extending opening, direction changing guides within the collar, and film guide rollers journaled in the bottom of the magazine within said collar.

2. In a picture film apparatus, a magazine comprising a stationary bottom and cylindrical side walls rigidly secured thereto, a vertically extending cylindrical collar centrally disposed within said magazine, a plurality of rollers journaled on vertical axes in the walls of said collar, a film supporting plate arranged to revolve about said collar, said film supporting plate having an upwardly extending peripheral flange, a removable cover arranged to rest on the side walls of the magazine, said cover being spaced from the upper edge of said peripheral flange, rollers carried by the magazine bottom for revolubly supporting said film supporting plate, frictional means arranged to project through the bottom of the magazine into contact with the bottom of the film supporting plate for rotating the latter, said collar being provided with a vertically extending opening, direction changing guides within the collar, and film guide rollers journaled in the bottom of the magazine within said collar.

In testimony whereof I have signed my name to this specification in the presence of two subscribing witnesses.

WILLIAM PINKNEY McNEEL.

Witnesses:
L. LOCKE,
W. O. GREEN.